United States Patent
Garner

[15] 3,690,797
[45] Sept. 12, 1972

[54] INJECTION MOULDING MACHINES

[72] Inventor: Paul Johnson Garner, Welwyn Garden City, England

[73] Assignee: Imperial Chemical Industries Limited, London, England

[22] Filed: Feb. 2, 1970

[21] Appl. No.: 7,865

[30] Foreign Application Priority Data

Feb. 18, 1969  Great Britain.............8,714/69

[52] U.S. Cl.................................425/146, 425/245
[51] Int. Cl. .................................B29f 1/03
[58] Field of Search......264/255; 18/30 NT, 30 NS, 30 RV, 18/30 NC, 13 E, 13 F, 13 J, 13 P, 13 R, 30 RM, 30 RH, 30 RP, 42 D, 13 C, 12 R, 30 NV, 13 H, 30 AA; 222/495; 137/110, 111, 112

[56] References Cited

UNITED STATES PATENTS

| | | | |
|---|---|---|---|
| 3,158,901 | 12/1964 | Westover | 18/30 AA X |
| 2,318,031 | 5/1943 | Tucker | 18/30 T X |
| 2,710,987 | 6/1955 | Sherman | 264/255 X |
| 2,936,489 | 5/1960 | Sherman | 264/255 X |

FOREIGN PATENTS OR APPLICATIONS 1,007,053  4/1957  Germany ...............18/30 AA

*Primary Examiner*—J. Spencer Overholser
*Assistant Examiner*—David S. Safran
*Attorney*—Cushman, Darby & Cushman

[57] ABSTRACT

Providing a value in a "two-shot" injection moulding machine which consists of a shuttle which can slide across the paths of polymer flow to block one while allowing polymer to flow along the other, the position of the shuttle being controlled by the relative pressures in the two polymer streams.

6 Claims, 2 Drawing Figures

INVENTOR
PAUL JOHNSON GARNER

INJECTION MOULDING MACHINES

The present invention relates to improvements in or relating to injection moulding machines.

It has been proposed to produce laminar articles by the sequential injection of two materials into a mould. If, however, it is necessary to produce an injection moulded article having a core of a certain material and surface layers of a different material, mixing of the two materials may be reduced if they are injected sequentially from one port into the mould. In this way the material forming the surface layers of the article is the first to be injected in to the mould and is then forced to the extremities of the mould by the pressure due to the injection of the core forming material thus ensuring that the surface layer material does in fact provide the whole of the surface. To ensure that there is a sharp distinction between the two materials it is desirable that they should be prevented from mixing before they are injected into the mould.

According to the present invention we provide in an injection moulding machine for synthetic resinous materials in which material is introduced to the mould from two separate sources along a single sprue, a valve comprising a shuttle which may slide across the paths of the materials under the influence of the pressures of the materials so as to permit material from only one of said sources to enter the sprue, the position of the shuttle being determined by the relative pressures exerted on the shuttle by the two materials.

Throughout the present specification, the term "-sprue" is used to describe the channel extending from the point where the two sources of material join to the mould cavity.

The present invention is particularly, but not exclusively, applicable to the production of articles having a foamed core and unfoamed surface layers. These articles may be produced by first injecting an unfoamable composition into the mould and subsequently injecting a foamable composition, which is then allowed to foam in the mould. The unfoamable composition thus provides the surface skin of the article and the foamable material the core. Conveniently, these articles may be made in an injection moulding machine having two injection barrels both of which introduce thermoplastic material into a single sprue from whence the material is injected into the mould. Thus, using an injection moulding machine according to the present invention, at the start of a moulding cycle the pressure on the material in the source of unfoamable material is greater than that on the material in the source of foamable material so that the valve is open to the unfoamable material but closed to the foamable material. While the desired amount of unfoamable material is being introduced into the sprue and mould cavity, the pressure on the foamable material is increased to a point where it is greater than the pressure on the unfoamable material when the desired amount of unfoamable material has been introduced. The shuttle then slides to block off the unfoamable material and allow foamable material to pass through the valve and into the mould. The foamable material is then allowed to foam within the mould; this foaming may be permitted either by injecting only an amount of material into the mould so that the mould will be filled when foaming has taken place or the mould cavity may be enlarged subsequent to the injection to provide room for the foamable material to expand. The mould may be enlarged mechanically or solely by the pressure generated by the decomposition of the blowing agent, whichever is convenient. The mould should preferably be closed to all the sources of material after the required amounts of material have been injected into the sprue and the mould to prevent further material dribbling from the sources into the sprue and to prevent material being forced back through the valve due to the pressures generated by the foaming of the foamable material within the mould. Conveniently a shut-off tap is provided between the valve and the sprue which can be switched to prevent any material entering the sprue from either source.

In a preferred method of operating a machine according to the present invention which is especially useful in the production of laminar articles having a foamed core with unfoamed surface skins, a second charge of the unfoamable composition is injected through the valve after the charge of the foamable composition. This may conveniently be achieved by adjusting the pressure on the source of unfoamable material so that it becomes greater than the pressure on the foamable material when the desired quantity of foamable material has been injected into the mould. Thus, when the pressure on the unfoamable material becomes greater the shuttle will slide to block off the foamable material and allow more unfoamable material into the mould. The purpose of introducing a second charge of unfoamable material is two-fold. Firstly, although most of the material in the sprue of the machine is removed with the moulding, there is generally some left in the sprue and the injection of the second charge of unfoamable material ensures that any material that remains in the sprue when the moulding is removed from the mould is unfoamable material. This is desirable because if there is some foamable material remaining in the sprue this will become part of the first charge of material used in the next moulding cycle and the presence of blowing agent in this first charge will mar the surface finish of the article produced. The second purpose of the second charge of unfoamable material is that it ensures that, when the material that was in the sprue during moulding and is attached to the moulding when it is removed from the mould is cut away from the moulding, an unfoamed and not a foamed area is exposed.

Our preferred form of valve is formed in a single block of metal through which the materials from the two sources may flow along separate, substantially parallel bores. The sliding shuttle may then conveniently be mounted in a channel joining the two bores in a direction transverse to their axes; the length of the shuttle must be greater than the width of the individual bores and so shaped that it will completely seal off each bore from the mould when it is forced into that bore by the higher pressure in the other bore. The surfaces of the shuttle onto which the polymer is forced from the sources of thermoplastic material should be shaped so that the forces exerted by the polymers act to urge the shuttle into the other bore of the valve. Conveniently, the upper surface of the shuttle is tapered so that the force of the polymer on this upper surface acts to urge the shuttle into the other bore. The two bores should converge into a single sprue at only a short distance beyond the sliding shuttle valve. In a preferred injection moulding machine according to the present invention the two bores converge in a tap situated immediately beyond the valve which may be switched to prevent any material from entering the sprue thus sealing the mould from the sources of material.

In our preferred moulding machines the two sources of material are the barrels of injection moulding machines from which molten material may be forced into the valve. The channels along which the materials flow should join as soon as possible after they have emerged from the valve because the longer the channel beyond the valve the greater the risk that the materials in the two channels will be mixed. The valve may conveniently be formed in the barrel end cap of a moulding machine or may be formed in the fixed platen of the machine or in a block attached to the fixed platen or in the mould itself. In our preferred machine the valve is formed in the barrel end cap of a moulding machine consisting of two injection barrels which are preferably parallel to each other.

The present invention is particularly applicable to the injection moulding of any thermoplastic material although it may be used for thermosetting materials. The materials from the separate sources may be the same or different as the case may be. Although the use of machines according to this invention has been described with particular reference to the injection moulding of articles having a foamed core and smooth surface layers, the invention is in no way limited to the production of such articles. For example, it may be used to produce articles comprising laminates of two different thermoplastic materials or two different colors of the same or different thermoplastic materials.

The timing of the operation of the machine according to the present invention must be synchronized so that the various operations involved take place at the correct time. Thus, firstly the mould is closed ready for the introduction of the moulding material, pressure is then applied to the material which is to be injected into the mould first so that the valve is opened to the first source of material; the pressure on the material in the second source is then increased while the first charge is being injected into the mould so that when the required quantity of the first material has been injected through the valve into the sprue the pressure on the material in the second source is greater than that on the first source so that the shuttle slides to allow only material from the second source to pass into the mould. The tap may then be closed to seal off the mould or the pressures adjusted to allow a further charge to be introduced from the first source as is required. Finally, if necessary, the mould is enlarged to allow any foaming to take place; the mould then opened and the moulding removed. The cycle may then be repeated.

One particular advantage of the moulding machines of the present invention is that while one charge of material is being injected into the mould the pressure on the material which is to form the next charge may be increased so that as soon as the required amount of the first charge has been introduced, the pressure on the second material causes the shuttle to slide and the second material to flow into the mould. Thus, it is possible to maintain an almost constant flow of material into the mould. If the flow of material into the mould is not constant a line tends to be formed on the surface of the moulding corresponding to the position of the edge of the first charge in the mould before the introduction of the second charge.

The present invention is illustrated but in no way limited by reference to the accompanying drawings, in which.

Figure 1:
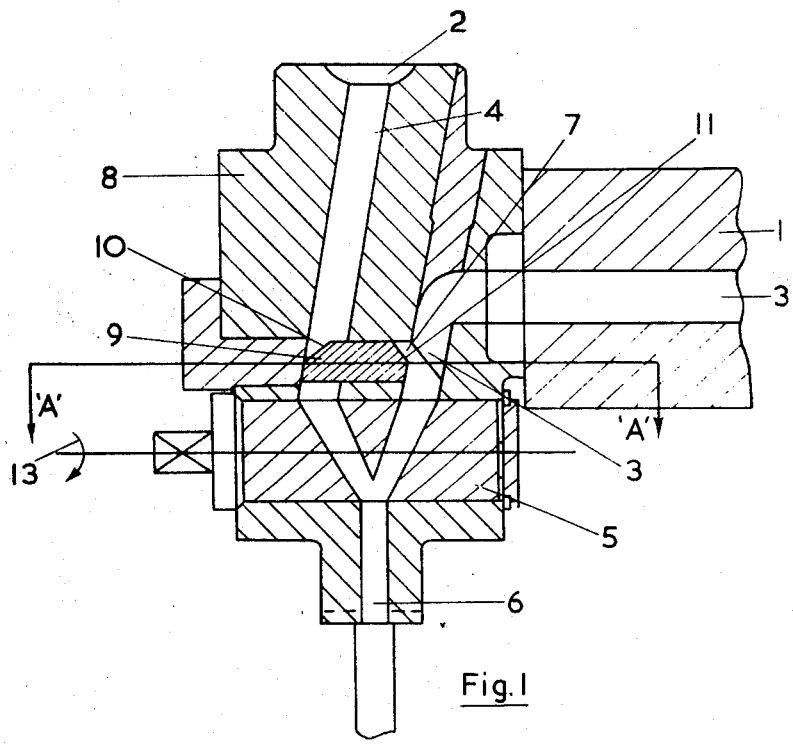
FIG. 1 is a section through the part of an injection moulding machine containing a valve according to the present invention.

With reference to FIG. 1, polymer flows from the barrels of two injection moulding units, the ends of which are shown at 1 and 2. The materials flow from the moulding units along channels 3 and 4 which converge in the shut-off tap 5 of the machine and then flow along the sprue 6 into the mould (not shown). A passageway 7 joining the channels 3 and 4 is formed within the valve body 8 and a sliding shuttle 9 is provided which is a close fit within the passageway 7. A portion of the upper surface of the shuttle 9 which is exposed to the material flowing in channel 4 is cut away as shown at 10 to provide a face which when acted on by the force of the material in channel 4 will tend to urge the shuttle 9 into the channel 3. Similarly, the upper face of the shuttle exposed to the material in the channel 3 is cut away as is illustrated at 11 so that forces acting thereon urge the shuttle into the channel 4. The shut-off tap 5 is rotatable within the valve housing 8 as illustrated by the arrow 13 and may thus be rotated so as to seal the sprue 6 from the channels 3 and 4.

Figure 2:
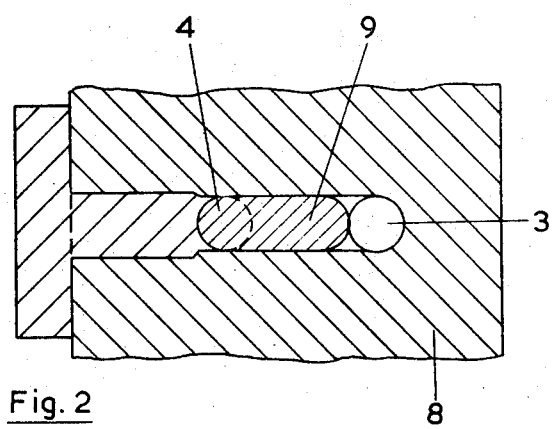
FIG. 2 is a section taken on AA' of FIG. 1.

FIG. 2, which is a cross-section on AA' of FIG. 1, illustrates the shape of the shuttle 9 demonstrating that when it is forced into one of the channels it forms a seal within the channel.

I claim:

1. An injection moulding machine for moulding two different synthetic resinous materials into a laminar article comprising two separate sources from which the two synthetic resinous materials are introduced into a mould along a common sprue, a valve means for controlling the flow of said material from said two separate sources, said valve means comprising separate bores communicating with said sources and converging into a single bore communicating with said common sprue, a shuttle having a length greater than the width of the individual separate bores and being disposed in a channel connecting said bores, said channel being located between said sources and the convergence of said bores into a single bore, said shuttle having a close fit in said channel and a portion of the upper surface of the shuttle nearest the said sources being suitably tapered so that the forces exerted on the upper surface of the shuttle by the material in one bore act to urge the shuttle into the other bore and slidably movable from a first position wherein the bore communicating with the first source is closed and the bore communicating with the second source is open, to a second position wherein the bore communicating with the second source is closed and the bore communicating with the first sources is open, the position of the shuttle being determined by the relative forces exerted on the shuttle by the materials in the sources immediately preceding the shuttle and a shut-off tap located between the said channel and the sprue which can be switched to prevent material from entering the sprue from either source.

2. An injection moulding machine adapted to moulding two different synthetic resins into a laminar article, comprising:
   1. a mould for receiving synthetic resin;
   2. a first resin injection means for generating a pressure on and injecting a first resin into said mould;
   3. a second resin injection means for generating a pressure on and injecting a second different resin into said mould;
   4. a valve means disposed between said first and second resin injecting means and said mould for controlling the flow of resin injected from said first and second injecting means to said mould;
   5. first channel means for communicating from said first resin injecting means and through said valve means;
   6. second channel means for communicating from said second resin injecting means and through said valve means;
   7. sprue means for communicating between said mould and said valve means and connecting with said first and second channel means at a point of convergence thereof;
   8. a tap means disposed between and communicating with said valve means and said point of convergence of said channels for completely cutting off the flow of resins to said mould; and
   9. said valve means having a pressure responsive means for operating said valve means to communicate the first injection means or said second injection means with said mould, said pressure responsive means being operable only in response to the pressures in said first and second injection means immediately preceding the said valve means and said valve means having a shuttle with a portion of the upper surface thereof nearest the said channel means being suitably tapered so that the forces exerted on the upper surface by the resin acts to urge the shuttle so that the shuttle operates from a first position in communication with said first injection means to a second position in communication with said second injection means and through an intermediate position in communication with both said first and second injection means, whereby a substantially constant flow of resin to said mould is maintained.

3. An injection moulding machine according to claim 1 in which the valve is formed in a single block of metal provided with two substantially parallel bores along which the two materials flow, respectively, and the shuttle is mounted in a channel joining the two bores in a direction transverse to their axes.

4. An injection moulding machine according to claim 1 in which the two separate sources are injection barrels both of which may introduce material into the single sprue.

5. An injection moulding machine according to claim 1 in which the paths of materials converge in a tap beyond the valve which may be switched to prevent any material from entering the sprue.

6. An injection moulding machine according to claim 1 in which the valve is formed in the barrel end cap of the moulding machine.

* * * * *